(12) United States Patent
Shmidt

(10) Patent No.: US 9,722,949 B2
(45) Date of Patent: Aug. 1, 2017

(54) REDUCING POWER UTILIZATION BY TRANSFERRING COMMUNICATION SESSIONS FROM A MAIN PROCESSOR

(71) Applicant: Google Inc., Mountain View, CA (US)

(72) Inventor: Dmitry Shmidt, Mountain View, CA (US)

(73) Assignee: Google Inc., Mountain View, CA (US)

( * ) Notice: Subject to any disclaimer, the term of this patent is extended or adjusted under 35 U.S.C. 154(b) by 273 days.

(21) Appl. No.: 14/633,889

(22) Filed: Feb. 27, 2015

(65) Prior Publication Data

US 2016/0255014 A1 Sep. 1, 2016

(51) Int. Cl.
*G06F 15/173* (2006.01)
*H04L 12/923* (2013.01)
(Continued)

(52) U.S. Cl.
CPC .......... *H04L 47/762* (2013.01); *G06F 1/3209* (2013.01); *G06F 1/3243* (2013.01); *G06F 1/3293* (2013.01); *H04L 67/148* (2013.01); *H04W 52/028* (2013.01); *Y02B 60/121* (2013.01); *Y02B 60/1239* (2013.01); *Y02B 60/50* (2013.01)

(58) Field of Classification Search
None
See application file for complete search history.

(56) References Cited

U.S. PATENT DOCUMENTS 6,289,464 B1 9/2001 Wecker et al.
7,251,745 B2 7/2007 Koch et al.
(Continued)

FOREIGN PATENT DOCUMENTS

EP 2533489 12/2012

OTHER PUBLICATIONS

Lazzaro, John. "Framing real-time transport protocol (RTP) and RTP control protocol (RTCP) packets over connection-oriented transport," RFC4571, Jul. 2006, pp. 1-9.
(Continued)

*Primary Examiner* — Umar Cheema
*Assistant Examiner* — Tony Williams
(74) *Attorney, Agent, or Firm* — McDonnell Boehnen Hulbert & Berghoff LLP

(57) ABSTRACT

A computing device may conduct a communication session. The communication session may be locally controlled by a main processor of the computing device. The main processor may be in a first power mode and may maintain an active state representation of the communication session. Packets of the communication session may pass through a network interface apparatus of the computing device, and a secondary processor in the network interface apparatus may examine at least some packets of the communication session to maintain a non-active state representation of the communication session. The main processor may transfer local control of the communication session to the secondary processor. The secondary processor may activate the non-active state representation and continue conducting the communication session using the activated state representation. The main processor may also transition from the first power mode to a second power mode that uses less power than the first power mode.

20 Claims, 9 Drawing Sheets

(51) Int. Cl.
*G06F 1/32* (2006.01)
*H04L 29/08* (2006.01)
*H04W 52/02* (2009.01)

(56) References Cited

U.S. PATENT DOCUMENTS

| | | | |
|---|---|---|---|
| 7,940,650 B1 | 5/2011 | Sandhir et al. | |
| 7,978,598 B1 | 7/2011 | Majee | |
| 8,934,389 B2 | 1/2015 | Kuehnel et al. | |
| 9,182,808 B1 | 11/2015 | Jones et al. | |
| 2004/0119814 A1* | 6/2004 | Clisham | H04N 7/141 348/14.08 |
| 2006/0080407 A1* | 4/2006 | Rengaraju | H04L 65/4061 709/219 |
| 2011/0093729 A1* | 4/2011 | Mucignat | G06F 1/3203 713/323 |
| 2012/0314650 A1* | 12/2012 | Medapalli | H04W 52/028 370/328 |
| 2013/0151623 A1* | 6/2013 | Weiser | H04N 7/147 709/205 |
| 2013/0315253 A1 | 11/2013 | Hegland et al. | |
| 2015/0277545 A1 | 10/2015 | Flowers et al. | |

OTHER PUBLICATIONS

Schulzrinne et al., "RTP: A transport protocol for real-time applications," RFC3550, Jul. 2003, pp. 1-89.
Schulzrinne et al., "RTP profile for audio and video conferences with minimal control," RFC3551, Jul. 2003, pp. 1-38.
International Searching Authority, International Search Report and Written Opinion mailed on Feb. 11, 2016, issued in connection with U.S. Patent Application No. PCT/US2015/060900, filed on Nov. 16, 2015, 15 pages.

* cited by examiner

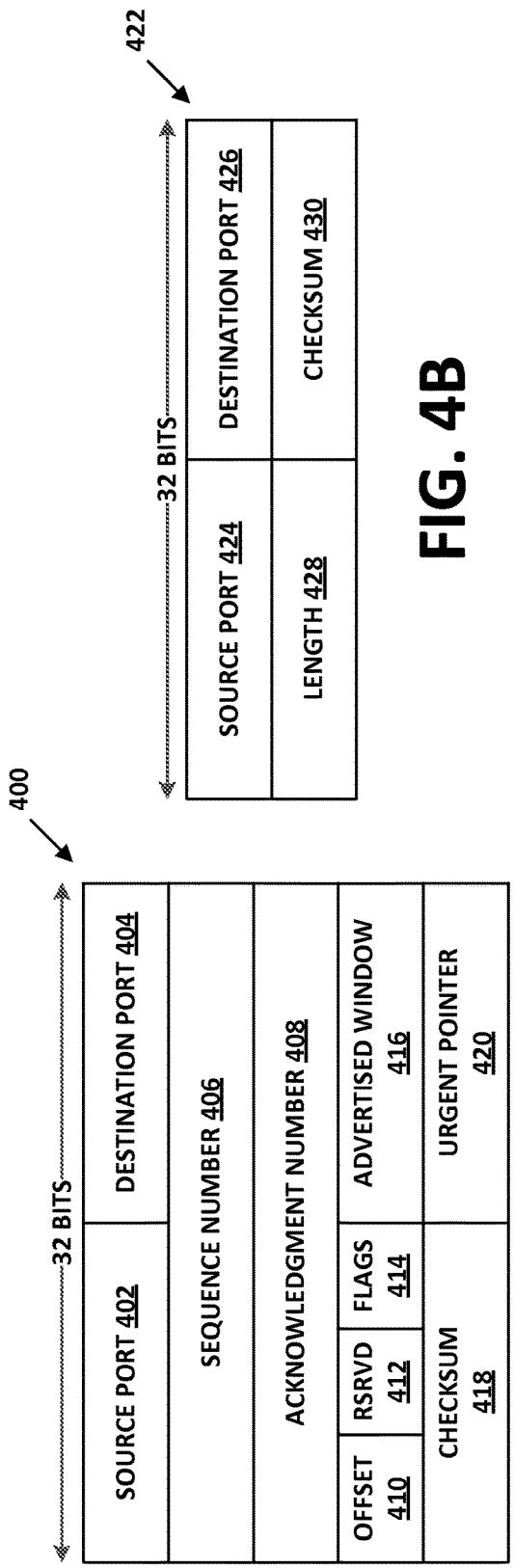
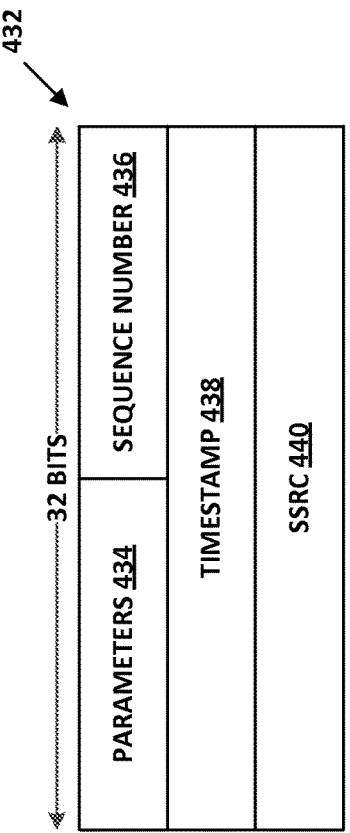
FIG. 4A
FIG. 4B
FIG. 4C

REDUCING POWER UTILIZATION BY TRANSFERRING COMMUNICATION SESSIONS FROM A MAIN PROCESSOR

BACKGROUND

Many modern wireless computing devices (WCDs) operate primarily on battery power. Battery technology has improved over the years, increasing the power provided by batteries. But, the power demands of WCDs, their operating systems, and their applications has increased as well. Consequently, many WCD users find that they charge their WCDs at least once a day. In many situations, such frequent charging is inconvenient, or might not be possible. Thus, it is desirable to further reduce the power utilization of WCDs.

SUMMARY

WCDs typically include a main processor, with one or more cores, as well as a network interface apparatus (e.g., a Wifi, Bluetooth, or cellular network interface) with a secondary processor disposed thereon. When the main processor is busy (e.g., sending or receiving packets via the network interface apparatus, interacting with the user via a touchscreen, or executing applications in the background), the main processor may be in a first power mode. But, when the main processor is not busy, it may enter a second power mode in which uses less (perhaps significantly less) power than when in the first power mode. As a result, it is desirable for the main processor to be in the second power mode to the extent possible in order to reduce the power utilization of the WCD and to increase battery life.

In some cases, the secondary processor of the network interface apparatus may be configuring to perform some of the tasks that a main processor has traditionally performed. For instance, the secondary processor may include one or more network protocol stacks. Consequently, the main processor may be able to offload certain network-related tasks to the secondary processor. In doing so, the main processor may be more likely to be able to transition from the first power mode to the second power mode, thereby improving the WCD's battery life.

A first example embodiment may involve conducting, by a computing device, a communication session with a correspondent device. The communication session may be locally controlled by a main processor of the computing device. The main processor may be in a first power mode and may maintain an active state representation of the communication session. Packets of the communication session may pass through a network interface apparatus of the computing device, and a secondary processor in the network interface apparatus may examine packets of the communication session to maintain a non-active state representation of the communication session. The first example embodiment may also involve determining, by the main processor, that local control of the communication session can be transferred to the secondary processor. Possibly in response to determining that local control of the communication session can be transferred to the secondary processor, the main processor may transfer local control of the communication session to the secondary processor. After local control of the communication session is transferred to the secondary processor, the secondary processor may activate the non-active state representation and continue to conduct the communication session using the activated state representation. The main processor may also transition from the first power mode to a second power mode, where the main processor uses less power when in the second power mode than when in the first power mode.

A second example embodiment may involve a computing device that includes a main processor and a secondary processor. The secondary processor may be disposed within a network interface apparatus of the computing device. The second example embodiment may also involve examining, by the secondary processor, packets of a communication session between the main processor and a correspondent device to maintain a non-active state representation of the communication session. The communication session may be locally controlled by the main processor, and the packets of the communication session may pass through the network interface. The second example embodiment may further involve determining, by the secondary processor, that local control of the communication session is to be transferred to the secondary processor. Possibly after determining that local control of the communication session is to be transferred to the secondary processor, the secondary processor may receive local control of the communication session. Possibly after local control of the communication session is received by the secondary processor, the secondary processor may activate the non-active state representation, and continue to conduct the communication session using the activated state representation.

A third example embodiment may involve a computing device that includes a network interface apparatus, a main processor, and a secondary processor disposed within the network interface apparatus. The network interface apparatus may be configured to exchange packets of a communication session with a correspondent device. The main processor may be configured to operate in either a first power mode or a second power mode. The main processor may also be configured to, while in the first power mode, (i) locally control the communication session, (ii) maintain an active state representation of the communication session, and (iii) transfer local control of the communication session to the secondary processor and enter the second power mode. The secondary processor may be configured to examine, while the main processor is in first power mode, packets of the communication session to maintain a non-active state representation of the communication session. The secondary processor may also be configured to, after local control of the communication session is transferred to the secondary processor, (i) activate the non-active state representation, and (ii) continue to conduct the communication session using the activated state representation.

In a fourth example embodiment, an article of manufacture may include a non-transitory computer-readable medium, having stored thereon program instructions that, upon execution by a computing device, cause the computing device to perform operations in accordance with any of the first, second, and/or third example embodiments.

In a fifth example embodiment, a computing device may include at least one processor, as well as data storage and program instructions. The program instructions may be stored in the data storage, and upon execution by the at least one processor may cause the computing device to perform operations in accordance with any of the first, second, and/or third example embodiments.

In a sixth example embodiment, a system may include various means for carrying out each of the operations of any of the first, second, and/or third example embodiments.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 4A illustrates a packet header, according to example embodiments.

FIG. 4B illustrates another packet header, according to example embodiments.

FIG. 4C illustrates an additional packet header, according to example embodiments.

DETAILED DESCRIPTION

Figure 1:
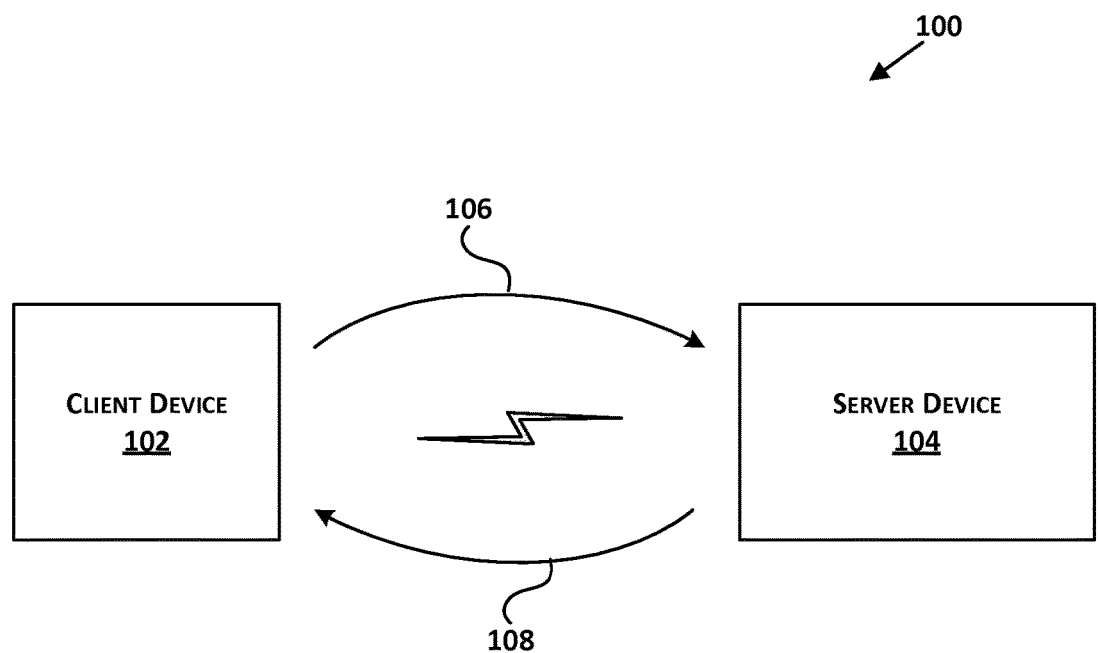
FIG. 1 depicts a client/server networked environment, according to example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

1. Overview

Battery life remains a limitation of many WCDs. For instance, heavy use of a smartphone may drain a battery at such a rate that the smartphone needs to be charged more than once a day. This charging is an inconvenience to users, especially users who move about from place to place as part of their daily routines.

The main processors of these WCDs, each of which may include multiple central processing unit (CPU) cores, are typically designed to enter a low-power mode when idle. In such a low-power mode, the main processor may draw less voltage, and/or operate at a lower clock rate, than when in a high-power mode. Thus, when the main processor is not performing user-interface, networking, or background processing tasks, the main processor may use less power than it otherwise would. In general, the idle mode of a main processor may be thought of as when the WCD's operating system and applications installed on the WCD are not using the main processor, or using less than a threshold amount of the main processor's resources. Alternatively, for multiple-core processors, one or more cores may transition into idle mode independently from the other cores. Thus, reducing the load on the main processor may result in power savings.

For instance, when a user is interacting with an application via the WCD's touchscreen, the WCD may be in a high-power mode so that the touchscreen can be lit, and therefore may make use of a particular extent of power. However, once the user stops using the WCD, the WCD's screen is turned off, and no applications (or a few applications) are running in the background, the WCD's main processor may transition from the high-power mode to the low-power mode. In the low-power mode, the main processor may make use of a lesser extent of power. In some cases, constant use of a WCD (i.e., the main processor remaining in the high-power mode) may drain the WCD's battery within 2-4 hours, while the WCD's battery may last more than 24 hours when the WCD is idle (e.g., the main processor is in the low-power mode).

The main processor may enter idle mode by issuing a "halt" instruction. Then, the main processor may operate in the low-power mode until it receives an interrupt. The interrupt may be triggered by an application requesting to run, the WCD receiving a packet from a network interface, the user interface of the WCD being used, or some other activity. Thus, it may be beneficial to prevent, when possible, the main processor from being woken up by one or more of these activities.

In particular, the WCD may engage in various types of communication sessions that involve audio. For instance, a user may instruct the WCD to stream audio (e.g., voice or music) from a correspondent device (e.g., a remote server), and the play this audio out of an audio speaker (e.g., a built-in audio speaker or an audio headset) of the WCD. Each time a packet containing part of the audio stream is received by the WCD, the main processor wakes up (transitions from the low-power mode to the high-power mode) to process this packet and its data, and then transmit the processed data to the audio speaker.

In another example, a user may instruct the WCD to engage in a bidirectional voice over IP (VOIP) communication session with a correspondent device (e.g., another WCD or a VOIP proxy server). For VOIP packets received by the WCD, the WCD may play this audio out of an audio speaker of the WCD. For VOIP packets transmitted by the WCD, the WCD may receive audio from an audio input (e.g., a microphone) of the WCD, digitize and packetize this audio, and transmit the resulting packets. Thus, each time a packet containing part of the VOIP communication session is processed by the WCD, the main processor wakes up.

Many WCDs support Wifi, also referred to as the Institute of Electrical and Electronics Engineers (IEEE) 802.11 family of local-area wireless protocols. Thus, the WCD may contain a Wifi network interface through which it receives packets from, and transmits packets to, correspondent devices. Many Wifi interfaces include a secondary processor that performs Wifi functionality. However, such a secondary processor may also be able to manage at least some of the WCD's communication sessions.

Since the secondary processor is already active managing the Wifi interface, it may be advantageous for the secondary processor to also take on at least some of the communication session management tasks of the WCD's main processor. In this way, the main processor might be able to transition into the low-power mode more frequently, thereby reducing its power requirements. For instance, the secondary processor taking on the communication session management tasks of the WCD's main processor may involve the main processor transferring, at least for a while, one or more of its communication sessions to the secondary processor.

The embodiments herein provide example procedures, WCDs, computing devices, and systems for reducing the power requirements (and therefore the negative impact on battery life) of operating communication protocols. The next section describes illustrative examples of such WCDs and systems.

2. Example WCDs and Systems

FIG. 1 illustrates an example communication system 100 for carrying out one or more of the embodiments described herein. Communication system 100 may include computing devices. Herein, a "computing device" may refer to either a client device (e.g., a WCD), a server device (e.g., a networked cluster of server equipment), or some other type of computational platform.

Client device 102 may be any type of device including a laptop computer, a wearable computing device, a WCD, a head-mountable computing device, a mobile telephone, or tablet computing device, etc., that is configured to transmit data 106 to and/or receive data 108 from a server device 104 in accordance with the embodiments described herein. For example, in FIG. 1, client device 102 may communicate with server device 104 via one or more wireless interfaces. In some cases, client device 102 and server device 104 may communicate with one another via a local-area network. Alternatively, client device 102 and server device 104 may each reside within a different network, and may communicate via a wide-area network, such as the Internet.

Client device 102 may include a user interface, a communication interface, a main processor, and data storage (e.g., memory). The data storage may contain instructions executable by the main processor for carrying out one or more operations relating to the data sent to, or received from, server device 104. The user interface of client device 102 may include buttons, a touchscreen, a microphone, and/or any other elements for receiving inputs, as well as a speaker, one or more displays, and/or any other elements for communicating outputs.

Server device 104 may be any entity or computing device arranged to carry out the server operations described herein. Further, server device 104 may be configured to send data 108 to and/or receive data 106 from the client device 102.

Data 106 and data 108 may take various forms. For example, data 106 and 108 may represent packets transmitted by client device 102 or server device 104 as part of a communication session. Such a communication session may include packets transmitted on a signaling plane (e.g., session setup, management, and teardown messages), and/or packets transmitted on a media plane (e.g., audio data).

Figure 2:
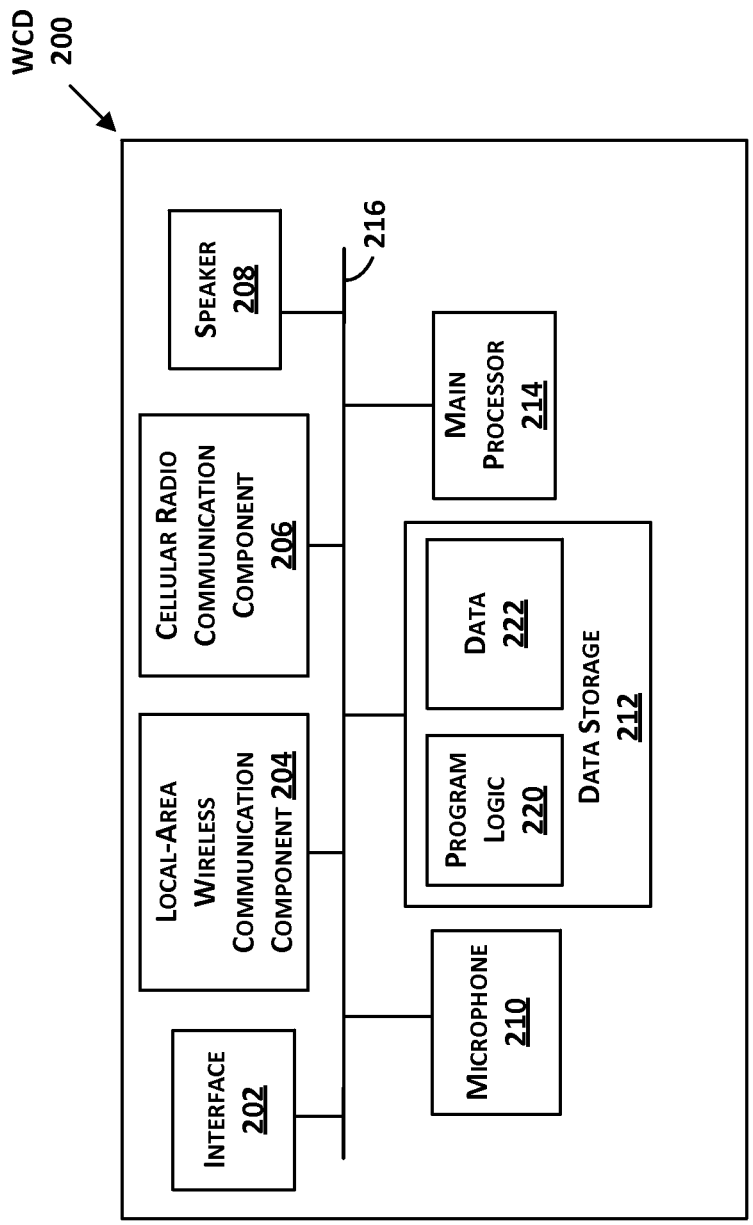
FIG. 2 illustrates a schematic drawing of a WCD, according to example embodiments.

FIG. 2 illustrates a schematic drawing of an example WCD 200, where WCD 200 is an example embodiment of client device 102. Thus, WCD 200 may, for example, take the form of any client device described above in relation to FIG. 1. In some examples, components illustrated in FIG. 2 may be distributed across multiple client devices. Nonetheless, for illustrative purposes, components are shown and described in FIG. 2 as part of an example WCD 200.

In some implementations, WCD 200 may include a device platform or operating system (not shown). The device platform may include different applications and an application framework, as well as various kernels, schedulers, memory managers, libraries, and runtime entities. In some examples, other formats or systems may operate on WCD 200 as well.

WCD 200 may include an interface 202, a local area wireless communication component 204, a cellular radio communication component 206, a speaker 208, a microphone 210, data storage 212, and a main processor 214. Components illustrated in FIG. 2 may be linked together by a communication bus 216. WCD 200 may also include additional hardware to enable further functionality and/or operations.

Interface 202 may be configured to allow a user to interact with WCD 200. Thus, interface 202 may include user-interface components, such as a keyboard, touchscreen, touchpad, presence-sensitive input device, display, etc.

Local-area wireless communication component 204 may be a communication interface that is configured to facilitate wireless data communication according to one or more wireless communication standards or non-standard protocols. For example, local-area wireless communication component 204 may include a Wifi interface that is configured to facilitate wireless data communication according to one or 802.11 protocols. As another example, local-area wireless communication component 204 may include a Bluetooth communication component that is configured to facilitate wireless data communication according to one or more Bluetooth protocols. Other examples are also possible.

Cellular radio communication component 206 may be a communication interface that is configured to facilitate wireless data and/or voice communication according to one or more wide-area wireless communication standards or non-standard protocols. For example, cellular radio communication component 206 may be configured to facilitate wireless data communication according to Code Division Multiple Access (CDMA), Worldwide Interoperability for Microwave Access (WIMAX), Universal Mobile Telecommunications System (UMTS), Long Term Evolution (LTE), or other protocols now known or later developed.

Speaker 208 may be any type of apparatus that can produce sound. In some cases, speaker 208 may convert digital representations of sounds (e.g., digitally encoded voice or music signals) into audible analog representations of the sounds. Speaker 208 may be integrated with WCD 200, or may exist as a removable module (e.g., headphones or an external speaker).

Microphone 210 may be any type of apparatus that can receive analog sound. In some cases, microphone 210 may convert analog representations of sounds into digital representations of these sounds. Like speaker 208, microphone 210 may exist as a removable module (e.g., an external microphone).

Data storage 212 may store program logic 220 that can be accessed and executed by main processor 214. Program logic 220 may include machine-readable instructions that, when executed by main processor 214, cause WCD 200 to carry out various operations and procedures. Data storage 212 may also store data 222 that may include data collected by any of interface 202, local-area wireless communication component 204, cellular radio communication component 206, and/or microphone 210. Data storage 212 may store additional data as well. Data storage 212 may be a non-transitory computer-readable data medium, such as a hardware memory module.

Main processor 214 may be any type of one or more microprocessors or general-purpose processors. However, main processor 214 may be integrated with or include various types of co-processors, network processors, graphics processors, and/or digital logic. Main processor 214 may support multiple power modes, including a low-power mode and a high-power mode. Main processor 214 may use less power when in the low-power mode than when in the high-power mode.

Communication bus 216 is illustrated as a wired connection; however, wireless connections may also be used. For example, communication bus 216 may be a wired serial bus, such as a universal serial bus (USB), or a parallel bus. Alternatively or additionally, communication bus 216 may be a wireless connection using, e.g., short-range wireless radio technology, communication protocols described in IEEE 802.11 (including any IEEE 802.11 revisions), or cellular technology, among other possibilities.

3. Example WCD Configurations

Figure 3A:
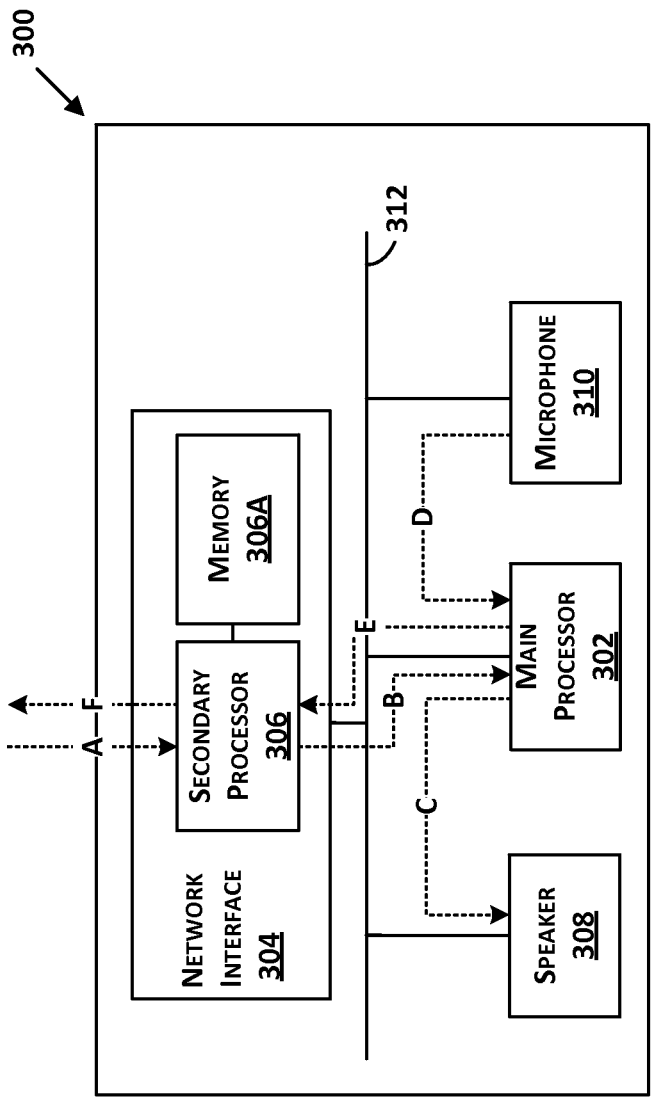
FIG. 3A illustrates data paths through a WCD, according to example embodiments.

FIG. 3A illustrates an example configuration of a WCD 300 in which the main processor of WCD 300 locally manages communication sessions with a correspondent device. In particular, it is assumed that these communication sessions involve bidirectional audio media (e.g., VOIP media plane data), but unidirectional communication sessions may be supported in a similar fashion. WCD 300 may include some or all of the components of WCD 200.

Particularly, WCD 300 includes main processor 302, network interface apparatus 304, speaker 308, and microphone 310. Network interface apparatus 304 may be a Wifi network interface, for example, and may include secondary processor 306 and memory 306A. WCD 300 may include other components not shown, such as a main memory and a user interface, for example.

When receiving packets from a communication session with the correspondent device, the data in the packets follows path A-B-C. Thus, network interface apparatus 304 receives these packets from the correspondent device, as denoted by path segment A. Secondary processor 306 may process these packets, possibly stripping off any medium access control (MAC) layer header and/or trailer, before forwarding the packets along path segment B to main processor 302. Alternatively, hardware disposed upon network interface 304 other than secondary processor 306 may carry out these actions.

Main processor 302 may receive the packets and extract the data (e.g., digital audio data) therein. Main processor 302 may strip off any higher-layer protocol headers and/or trailers from the packets. For instance, main processor 302 may perform TCP/IP and/or UDP/IP operations on these packets (here, TCP stands for the Transmission Control Protocol, UDP stands for the User Datagram Protocol, and IP stands for the Internet Protocol). Then, main processor 302 may forward the digital audio data along path segment C to speaker 308. Speaker 308, may, in turn, convert the digital audio data into analog sounds. Alternatively, main processor 302 may perform the digital-to-analog conversion.

When WCD 300 is transmitting packets of the communication session to the correspondent device, the data in these packets may follow path D-E-F. Thus, microphone 310 may receive analog sounds, and convert these sounds into digital audio data. Microphone 310 may forward this digital audio data along path segment D to main processor 302. Alternatively, main processor 302 may perform this analog-to-digital conversion.

Regardless, main processor 302 may obtain the digital audio data, packetize it, perhaps in higher-layer (e.g., TCP/IP and/or UDP/IP) headers and/or trailers, and forward it along path segment E to network interface 304. Secondary processor 306 may process these packets, perhaps adding any appropriate MAC layer header and/or trailer to the packet. Then secondary processor 306 may forward the packets along path segment F to the correspondent device. Alternatively, hardware disposed upon network interface 304 other than secondary processor 306 may carry out these actions.

In the embodiment of FIG. 3A, memory 306A may store information used by secondary processor 306 to carry out any of these MAC-layer activities. This information may include, for instance, the MAC address of network interface 304, any virtual local area network tags used by network interface 304, and so on.

Figure 3B:
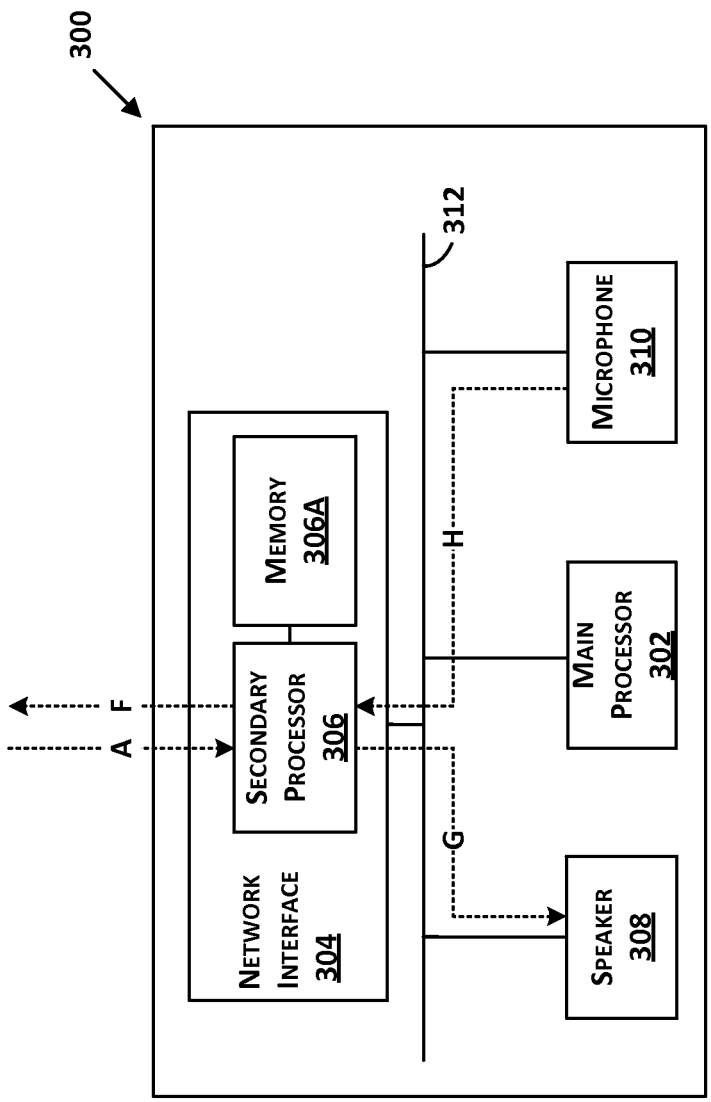
FIG. 3B illustrates alternative data paths through a WCD, according to example embodiments.

In contrast to the embodiment illustrated in FIG. 3A, which involves main processor 302 in the transmission and reception of each packet of the communication session, the embodiment illustrated in FIG. 3B encompasses similar operations without main processor 302 processing all of these packets. Communication paths that do not include main processor 302 may be referred to as "direct" communication with secondary processor 306 (e.g., from secondary processor 306 to speaker 308, or from microphone 310 to secondary processor 306). However, it should be understood that such "direct" communication may include various busses, wires, or intermediate components. In some situations, specific hardware support for direct communication between secondary processor 306 and each of speaker 308 and microphone 310 may be included in WCD 300.

In FIG. 3B, when WCD 300 receives packets from a communication session with the correspondent device, the data in the packets follows path A-G. Thus, network interface apparatus 304 receives these packets from the correspondent device, as denoted by path segment A. Secondary processor 306 may process these packets, possibly stripping off any MAC layer header and/or trailer, as well as any higher-layer protocols headers and/or trailers. For instance, secondary processor 306 may also perform TCP/IP and/or UDP/IP processing on the packets. Then, secondary processor 306 may forward the digital audio data from these packets along path segment G to speaker 308. Speaker 308, may, in turn, convert the digital audio data into analog sounds. Alternatively, secondary processor 306 may perform the digital-to-analog conversion.

When WCD 300 is transmitting packets of the communication session to the correspondent device, the data in these packets may follow path H-F. Thus, microphone 310 may receive analog sounds, and convert these sounds into digital audio data. Microphone 310 may forward this digital audio data along path segment H to secondary processor 306. Alternatively, secondary processor 306 may perform this analog-to-digital conversion.

Regardless, secondary processor 306 may obtain the digital audio data, packetize it, perhaps in higher-layer (e.g., TCP/IP and/or UDP/IP) headers and/or trailers, and add any appropriate MAC layer header and/or trailer to the packets. Then, secondary processor 306 may forward the packets along path segment F to the correspondent device.

In the embodiment of FIG. 3B, memory 306A may store information used by secondary processor 306 to carry out any of these networking activities. This information may include, for instance, the MAC address of network interface 304, any virtual local area network tags used by network interface 304, state associated with the TCP, UDP, IP, and/or other layers of the communication session, and so on.

A difference between the embodiments of FIG. 3A and FIG. 3B is that main processor 302 is likely to remain in a high-power mode when carrying out the embodiment of FIG. 3A. On the other hand, main processor 302 may be able to transition to a low-power mode when carrying out the embodiment of FIG. 3B. Thus, it may be desirable for WCD 300 to operate according to the embodiment of FIG. 3B when possible. In some cases, doing so may involve WCD 300 transferring at least part of the state of the communication session (e.g., the TCP/IP and/or UDP/IP state, and perhaps some application layer state) from main processor 302 to secondary processor 306. In this way, main processor 302 may be more likely to become idle and therefore eligible for transitioning to the low-power mode. Additionally, since secondary processor 306 may be involved in the transmission or reception of each packet anyway, adding this high-layer protocol processing to secondary processor 306 may not have an appreciable impact on that processor's power requirements.

4. Example Packet Header Information and State

In order illustrate how the state of higher-layer protocols (e.g., TCP/IP, UDP/IP, and/or other protocols) can be transferred from main processor 302 to secondary processor 306, it is helpful to first discuss how certain types of communication sessions are carried out, and what types of header information may be contained with the media plane packets therein.

Real-time communication sessions, such as VOIP and streaming audio may be divided into two logical planes: a signaling plane and a media plane. Each of these planes may be associated with different protocols. For instance, a VOIP session may be set up, managed, and torn down by the Session Initiation Protocol (SIP), perhaps including data formatted according to the Session Description Protocol (SDP). These protocols, as well as their associated processing and data, may encompass the signaling plane.

After establishment of a VOIP session, packets may also be transmitted according to media plane protocols, until the VOIP session is torn down. For instance, the media plane may include bidirectional communication according to the Real-Time Protocol (RTP), and possibly the Real-Time Control Protocol (RTCP).

Similarly, a streaming session may be set up, managed, and torn down by the Real-Time Streaming Protocol (RTSP), perhaps including data formatted according to SDP. These protocols, as well as their associated processing and data, may encompass the signaling plane. After establishment of the streaming session, packets may also be transmitted according to media plane protocols, until the streaming session is torn down. For example, the media plane may include unidirectional communication according to RTP, and possibly RTCP.

Once a VOIP or streaming session is set up, relatively few signaling plane packets will be transmitted and received. However, a relatively large amount of media plane packets may be transmitted and received. In some examples, RTP packets may be transmitted every 10, 20, or 50 milliseconds for each direction of the communication session, while communication on the signaling plane might only take place at the beginning and end of the communication session. Accordingly, it may be beneficial to transfer the media plane of a communication session from a main processor to a secondary processor, even if the signaling plane of the communication session remains at the main processor.

Given that at least the media plane of some communication sessions may be transferred, FIGS. 4A, 4B, and 4C depict example packet headers of protocols that may be used on a media plane. FIG. 4A depicts a TCP header, FIG. 4B depicts a UDP header, and FIG. 4C depicts an RTP header. Nonetheless, other protocols may be used on the media plane and with the embodiments described herein.

In some implementations, RTP may be encapsulated within UDP, which is, in turn, encapsulated within IP. This provides an unreliable media plane session that is suitable for VOIP purposes, because VOIP applications tolerate some packet loss, but are intolerant of delay. On the other hand, RTP may be encapsulated within TCP, which is, in turn, encapsulated within IP. This provides a reliable media plane session that is suitable for streaming purposes, because many streaming applications tolerate some delay, but are less tolerant of packet loss.

TCP is a reliable, end-to-end protocol that operates on the transport layer of a networking protocol stack. TCP is connection-oriented, in the sense that TCP connections are explicitly established and torn down. TCP includes mechanisms in which it can detect likely packet loss between a sender and recipient, and resend potentially lost packets. TCP is also a modified sliding window protocol, in that only a limited amount of data may be transmitted by the sender before the sender receives an acknowledgement for at least some of this data from the recipient, and the sender may operate a congestion control mechanism to avoid flooding an intermediate network with an excessive amount of data.

FIG. 4A depicts the first 20 bytes of a TCP header 400 as five rows of 32-bit blocks. Some TCP headers may use more than 20 bytes. TCP header 400 includes source port 402 and destination port 404. Each of these ports may identify one or more application processes or threads of execution that has transmitted or will receive the packet.

TCP header 400 also includes sequence number 406 and acknowledgment number 408, both representing bytes transmitted and/or acknowledged by the participants in the TCP session. Sequence number 406 may represent the relative offset of the next byte that the sender of TCP header 400 will transmit. Acknowledgment number 408 may represent the sequence number of the next byte that the sender of TCP header 400 expects to receive. By using sequence and acknowledgment numbers, the participants in the TCP session can carry out TCP's sliding window protocol.

Offset 410 may encode the length of TCP header, and reserved (rsrved) 412 may be ignored. Flags 414 may include six 1-bit values that, for example, indicate the beginning of a TCP session, the end of a TCP session, whether the urgent pointer should be considered, and various other aspects of the state of TCP header 400 or its associated TCP session.

Advertised window 416 may indicate the maximum number of bytes that can be transmitted by the other participant in the TCP session, but unacknowledged by the sender of TCP header 400. Thus, advertised window 416 may represent the size of the TCP sliding window.

Checksum 418 may be a 16-bit one's complement calculation of TCP header 400, the data contained therein, as well as various other parts of the packet in which TCP header 400 resides. When used, urgent pointer 420 points to any emergency data in the TCP packet that should be immediately delivered to the application associated with destination port 404.

UDP is a connectionless, unreliable protocol. Unlike TCP, UDP maintains little state regarding any UDP session, and does not guarantee delivery of application data that it contains.

FIG. 4B depicts 8 bytes of UDP header 422 as two rows of 32 bits. Source port 424 and destination port 426 may serve similar functions as those of source port 402 and destination port 404, respectively. Length 428 may represent the number of bytes in UDP header 422, as well as any application data contained therein. Checksum 420 may be a 16-bit one's complement calculation of the data contained in UDP header 422, as well as various other parts of the packet in which UDP header 422 resides.

RTP is a framing protocol for real-time or near-real-time media. Thus, RTP headers may contain media data such as digitized audio, video, and so on.

FIG. 4C depicts 12 bytes of RTP header 432 as three rows of 32 bits. Parameters 434 include various values that are generally static throughout the lifetime of an RTP session. Sequence number 436 may increment by one for each RTP packet sent, and therefore may be used by the recipient to detect packet loss and to restore the proper sequence of packets that arrive at the recipient out of order. Timestamp 438 may represent the time at which the first byte of the data contained within RTP header 432 was sampled. SSRC 440 may identify a source of the data contained within RTP header 432. RTP header 432 may also include identities of one or more additional sources, in situations where there is more than one speaker contributing to the encapsulated media therein for instance.

Each field depicted in FIGS. 4A, 4B, and 4C may be categorized as either static, dynamic, or derivable. A static field may maintain the same value for the lifetime of the media session. Examples of static fields are source port 402, destination port 404, and reserved 412 of TCP header 400, as well as source port 424 and destination port 426 of UDP header 422.

The value of a dynamic field may change from packet to packet. Examples of dynamic fields include sequence number 406, acknowledgment number 408, advertised window 416, and urgent pointer 420 of TCP header 400, and all fields of RTP header 432.

Derivable fields may be determined based on the known values of other fields in the header, and perhaps other information as well. Examples of derivable fields include offset 410, flags 414, and checksum 418 of TCP header 400, and length 428 and checksum 430 of UDP header 422.

In order for media plane session state to be transferred from a main processor to a secondary processor, the values of static and dynamic fields associated with communication protocols used in the media plane may be communicated from the main processor to the secondary processor. Alternatively, the secondary processor may be able to read the packets of the media plane session because, as shown in FIG. 3A, these packets pass through the network interface on which the secondary processor is disposed.

The values of the derivable fields might not be communicated or read, as the secondary processor may be able to determine appropriate values for these fields based on the information that is in the static and dynamic fields, as well as potentially other information.

In this way, the secondary processor may maintain a non-active state representation of the media plane session, while the main processor maintains an active state representation of the media plane session. The active state representation may contain enough information to operate the protocol, while the non-active state representation includes the values of variables (e.g., header field values) that are stored until needed. Therefore, when the main processor transfers the media plane session to the secondary processor, the secondary processor should have enough information to continue the media plane from where the main processor left off.

In some situations, the secondary processor may transfer the media plane session back to the main processor. This may take place, for instance, when the media plane session ends, or is about to end, or when the main processor transitions from the low-power mode to the high-power mode for some other reason. The end, or an imminent end, of a media plane session may be detected by an explicit teardown of the associated signaling plane session, for instance.

Regardless, during the transfer of the session, the secondary processor may provide the main processor with sufficient media plane session state so that the main processor can continue carrying out the media plane session. Thus, any particular media plane session may be transferred back and forth between the main processor and the secondary processor several times.

Figure 5A:
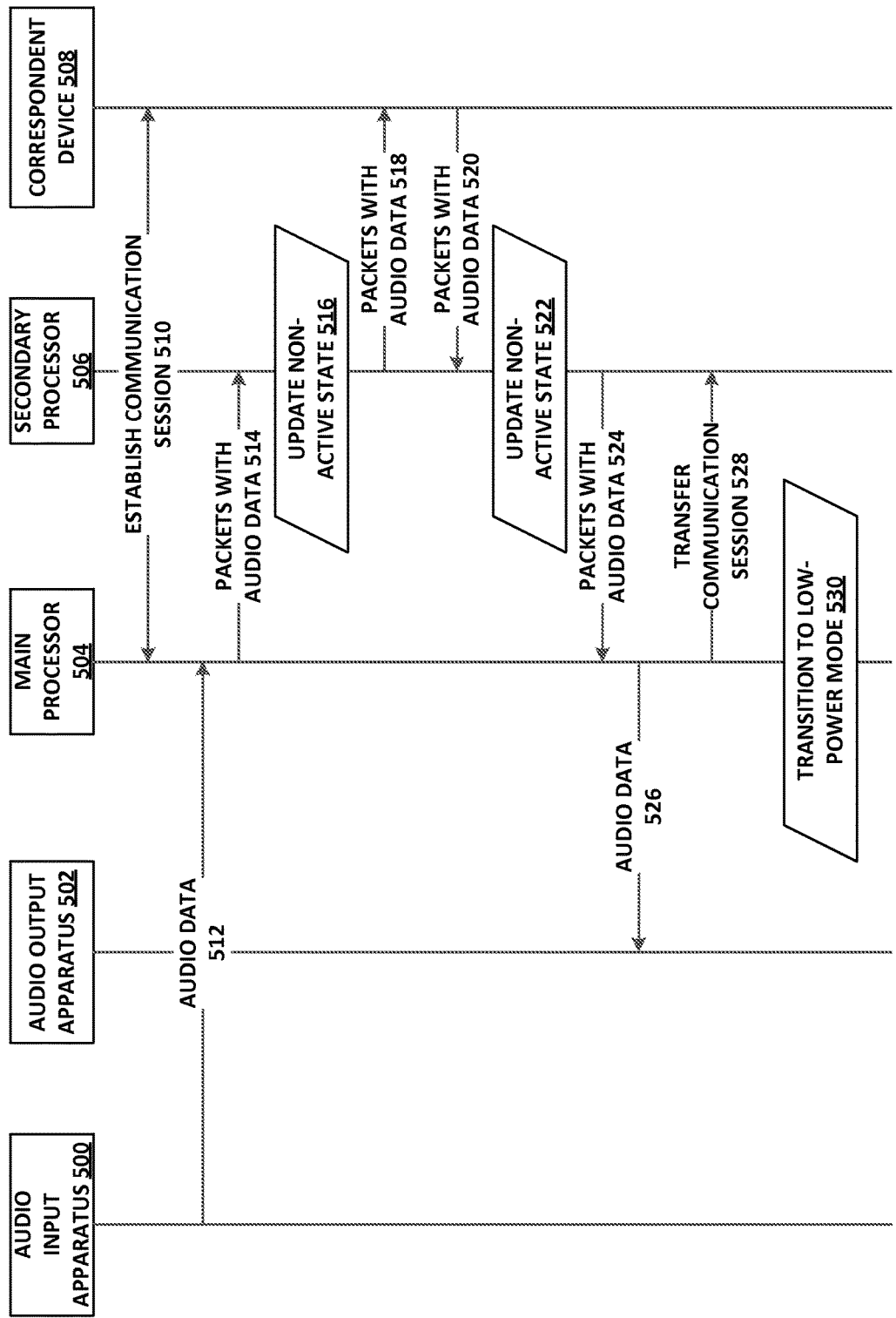
FIG. 5A illustrates a message flow diagram, according to example embodiments.
Figure 5B:
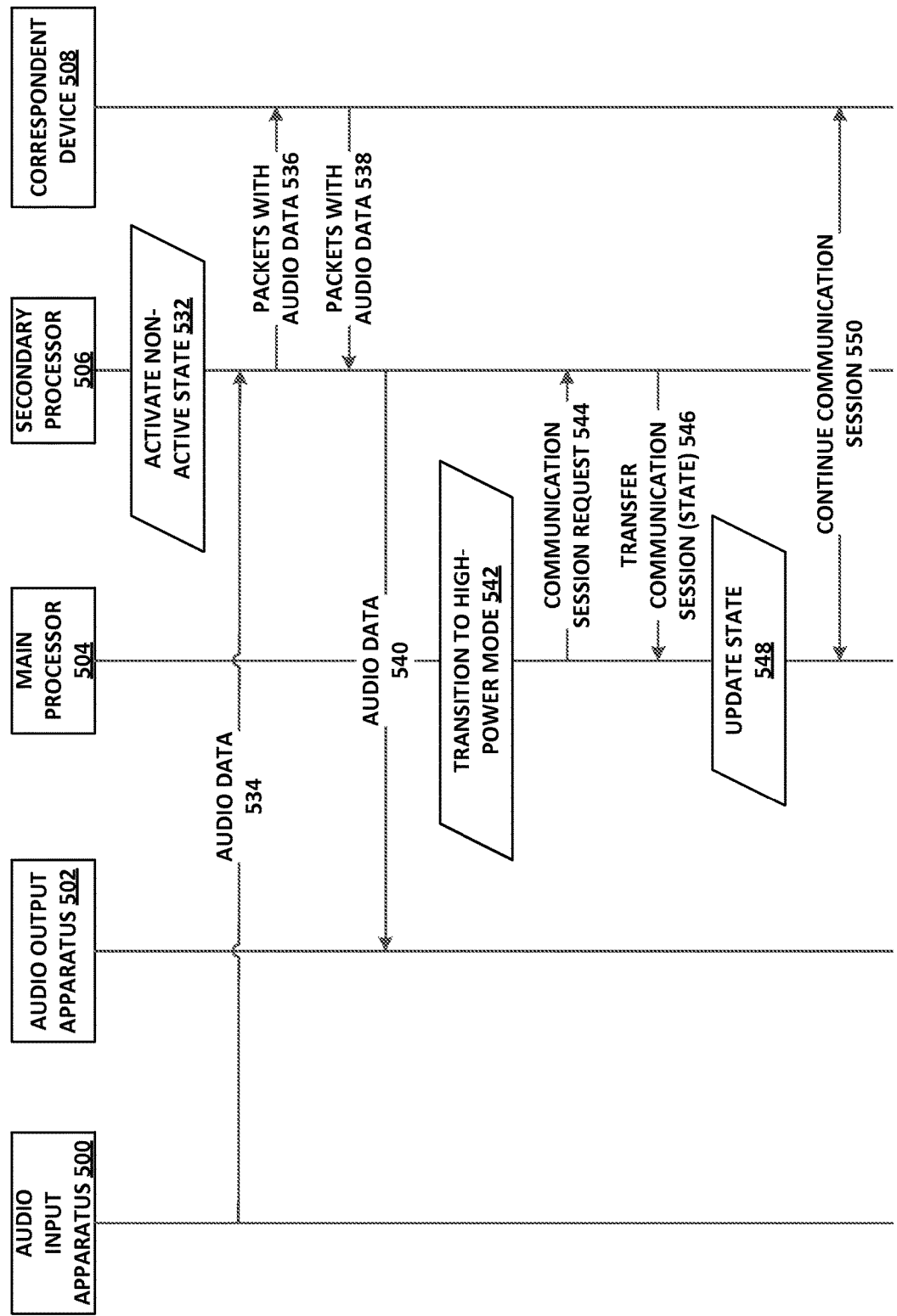
FIG. 5B illustrates another message flow diagram, according to example embodiments.

Example transfers are shown in FIGS. 5A and 5B. These figures depict audio input apparatus 500, audio output apparatus 502, main processor 504, and secondary processor 506 of a computing device. This computing device is configured to communicate with correspondent device 508. For sake of simplicity, these figures do not show any memories associated with either main processor 504 or secondary processor 506. In some embodiments, secondary processor 506 may be disposed upon a network interface apparatus. Initially, main processor 504 is in a high-power mode.

At step 510, main processor 504 establishes a communication session with correspondent device 508. This communication session may be a bidirectional VOIP session, for instance. At step 512, audio input apparatus 500 transmits audio data to main processor 504. This audio data may have been received from a user of the computing device speaking into audio input apparatus 500. Main processor 504 packetizes this audio data (e.g., within RTP, UDP, and IP headers) and, at step 514, forwards these packets to secondary processor 506. At step 516, secondary processor 506 may update a non-active state representation of the session. For example, secondary processor 506 may read fields from one or more of the headers of these packets to carry out the updating (e.g., RTP parameters, sequence numbers and timestamps may be read from these packets and written to a memory). At step 518, secondary processor 506 may transmit these packets to correspondent device 508.

At step 520, secondary processor 506 may receive packets with audio data from correspondent device 508. At step 522, secondary processor 506 may update its non-active state representation of the session. Once again, secondary processor 506 may read fields from one or more of the headers of these packets to carry out the updating. At step 524, secondary processor 506 may forward the packets to main processor 504. Main processor 504 may strip off the packet headers (e.g., the RTP, UDP, and IP headers), and at step 526, forward the audio data to audio output apparatus 502. Audio output apparatus 502 may play out this audio data.

When reading fields from packets secondary processor may read just dynamic fields, dynamic fields and static fields, or dynamic, static and derivable fields. Reading few fields may be more efficient, but reading more fields may be beneficial for purposes of error detection, for example.

At step 528, main processor 504 may transfer the communication session to secondary processor 506. This transfer may be triggered by the communication session being in a particular state (e.g., fully established), a certain amount of time passing since the establishment of the communication session, or by some other event. Regardless, transferring the communication session may involve main processor 504 transmitting a representation of the current state of the communication session (e.g., the current values of the static and/or dynamic fields in the packet headers of the communication session) to secondary processor 506, as well as an instruction for secondary processor 506 to take over local control of the communication session. Main processor 506 may also instruct audio input apparatus 500 and audio output apparatus 502 to communicate directly with secondary processor 506.

At step 530, main processor 504 may transition from the high-power mode to a low-power mode. This transition may occur in response to the transfer of the communication session, or may be based on one or more other factors.

Turning to FIG. 5B, at step 532, secondary processor 506 may activate its non-active state for the communication session. For instance, secondary processor 506 may initiate its RTP, UDP and IP state machines with parameters from the non-active state, and/or received from main processor 504 at step 528, so that secondary processor 506 can take over local control of the communication session.

Herein, the term "local control" may refer to which processor operates the networking protocols used by the communication session. Many communication sessions are controlled, to at least some extent, by both participants therein. However, the control exerted by the WCD on the communication session may take place in more than one physical location.

At step 534, audio input apparatus 500 may transmit audio data to secondary processor 506. Secondary processor 506 packetizes this audio data (e.g., within RTP, UDP, and IP headers) and, at step 536, forwards these packets to correspondent device 508. At step 538, secondary processor 506 may receive packetized audio data from correspondent device 508. Secondary processor 506 may strip off the packet headers (e.g., the RTP, UDP, and IP headers), and at step 540, forward the audio data to audio output apparatus 502. Audio output apparatus 502 may play out this audio data.

At step 542, main processor 504 may transition to the high-power mode. This transition may be triggered by various events, such as the user of the computing device turning on its screen, or an application operating on the computing device requiring more than a limited extent of computational resources. Possibly in response to this transitioning, at step 544, main processor 504 may transmit a communication session request to secondary processor 506. At step 546, secondary processor 506 may respond to this request by transferring the communication session back to main processor 504. This transfer may include secondary processor 506 transmitting the state of the communication session to main processor 504. The state may include, for example, static and/or dynamic RTP, UDP and IP header fields. At step 548, main processor 504 may update its representation of the communication session state, and at step 550, main processor 504 may continue the communication session with correspondent device 508.

Each transfer of the communication session state from one processor to another may occur such that the correspondent device is not aware of the transfer. Thus, the transfers may be transparent to devices other than the computing device that incorporates the two processors. Further, the communication session state may be transferred back and forth between the processors multiple times during the lifetime of the communication session.

5. Example Operations

Figure 6:
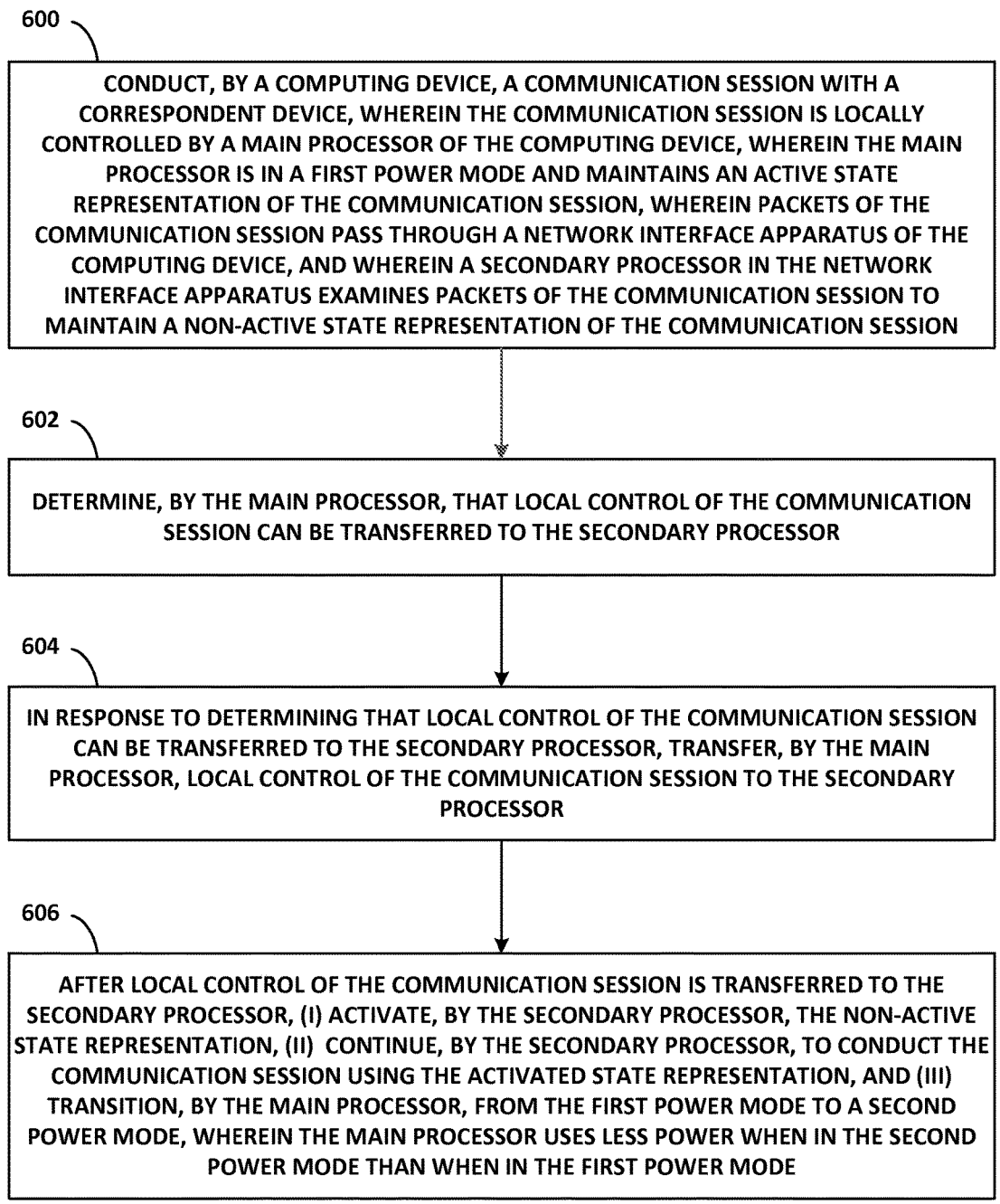
FIG. 6 is a flow chart, according to example embodiments.
Figure 7:
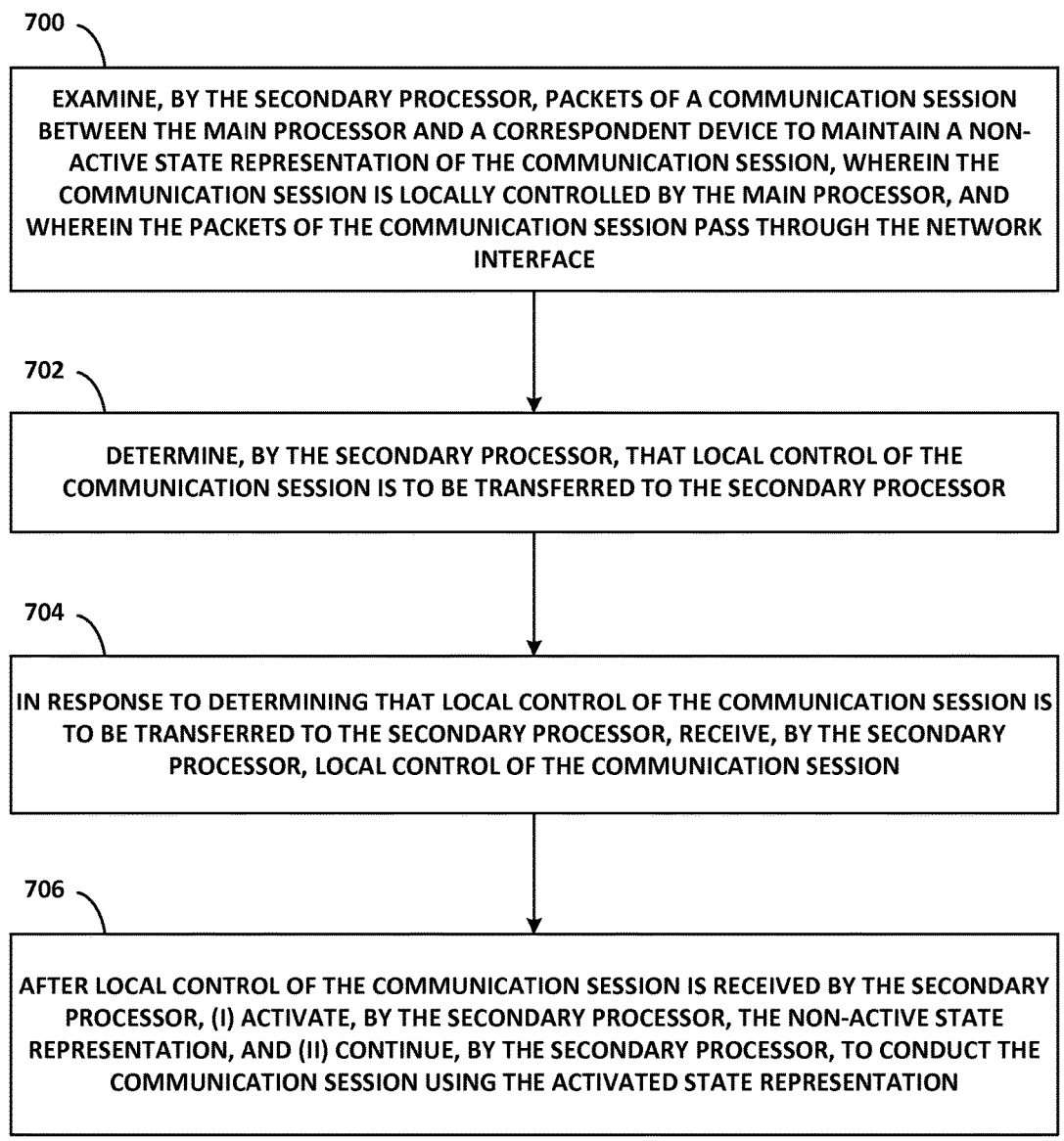
FIG. 7 is another flow chart, according to example embodiments.

FIGS. 6 and 7 are flow charts illustrating example embodiments. The embodiments illustrated by FIGS. 6 and 7 may be carried out by a computing device, such as WCD 200. However, the embodiments can be carried out by other types of devices or device subsystems. Further, the embodiments may be combined with one another and may incorporate any aspect or feature disclosed in this specification or the accompanying drawings.

Block 600 of FIG. 6 may involve conducting, by a computing device, a communication session with a correspondent device. The communication session may be locally controlled by a main processor of the computing device. While conducting the communication session, the main processor may be in a first power mode and may maintain an active state representation of the communication session. Packets of the communication session may pass through a network interface apparatus of the computing device, and a secondary processor in the network interface apparatus may examine packets of the communication session to maintain a non-active state representation of the communication session.

Block 602 may involve determining, by the main processor, that local control of the communication session can be transferred to the secondary processor. Block 604 may involve, possibly in response to determining that local control of the communication session can be transferred to the secondary processor, transferring, by the main processor, local control of the communication session to the secondary processor.

Block 606 may involve, possibly after local control of the communication session is transferred to the secondary processor, (i) activating, by the secondary processor, the non-active state representation, (ii) continuing, by the secondary processor, to conduct the communication session using the activated state representation, and (iii) transitioning, by the main processor, from the first power mode to a second power mode. The main processor may uses less power when in the second power mode than when in the first power mode.

The main processor may be a general purpose processor, and the secondary processor may be a Wifi interface processor.

Determining that local control of the communication session can be transferred to the secondary processor may involve determining that the main processor is not waiting for arrival of fragmented packets for the communication session.

The communication session may include a signaling plane and a media plane. Transferring local control of the communication session to the secondary processor may involve transferring local control of the media plane to the secondary processor while local control of the signaling plane remains with the main processor.

The computing device may include an audio output apparatus. The main processor locally controlling the communication session may involve the main processor (i) receiving incoming packets of the communication session from the network interface apparatus, and (ii) forwarding incoming data from the incoming packets to the audio output apparatus. The secondary processor locally controlling the communication session may involve the secondary processor (i) receiving the incoming packets of the communication session from the correspondent device, and (ii) forwarding the incoming data from the incoming packets directly to the audio output apparatus.

The computing device may also include an audio input apparatus. The main processor locally controlling the communication session may involve the main processor (i) receiving outgoing data from the audio input apparatus, and (ii) forwarding the outgoing data, in the form of outgoing packets, to the network interface apparatus. The secondary processor locally controlling the communication session may involve the secondary processor (i) receiving the outgoing data directly from the audio input apparatus, and (ii) forwarding the outgoing data, in the form of outgoing packets, to the correspondent device.

The secondary processor examining packets of the communication session to maintain the non-active state representation of the communication session may involve reading session state information from the examined packets, and writing at least some of the session state information to the non-active state representation of the communication session. The communication session may be a TCP session, and the session state written to the non-active state representation may include a TCP sequence number, a TCP acknowledgment number, and a TCP advertised window. Continuing, by the secondary processor, to conduct the communication session may involve continuing to conduct the TCP session using the TCP sequence number, the TCP acknowledgment number, and the TCP advertised window. Nonetheless, different or additional session state may be written to the non-active state representation if the communication session includes UDP, RTP and/or some other protocol.

Some embodiments may involve determining, by the secondary processor, that the communication session is ending or has ended. Possibly in response to determining that the communication session is ending or has ended, the secondary processor may transfer local control of the communication session back to the main processor. The main processor may transition from the second power mode to the first power mode. Then, the main processor may terminate the communication session. Terminating the communication session may involve exchanging, by the main processor, signaling packets with the correspondent device to close the communication session. Transferring local control of the communication session back to the main processor may involve transmitting, by the secondary processor, packets of the communication session from the secondary processor to the main processor.

Some embodiments may involve determining that the main processor has transitioned from the first power mode to the second power mode, and possibly in response to determining that the main processor has transitioned from the first power mode to the second power mode, transferring, by the secondary processor, local control of the communication session back to the main processor.

The embodiment of FIG. 7 may involve a computing device that includes a main processor and a secondary processor, where the secondary processor is disposed within a network interface apparatus of the computing device.

Block 700 may involve examining, by the secondary processor, packets of a communication session between the main processor and a correspondent device to maintain a non-active state representation of the communication session. The communication session may be locally controlled by the main processor, and the packets of the communication session pass through the network interface.

Block 702 may involve determining, by the secondary processor, that local control of the communication session is to be transferred to the secondary processor. This determination may be made based on receiving an instruction from the main processor, where the instruction indicates that the secondary processor is to assume local control of the communication session.

Block 704 may involve, possibly after determining that local control of the communication session is to be transferred to the secondary processor, receiving, by the secondary processor, local control of the communication session.

Block 706 may involve, after local control of the communication session is received by the secondary processor, (i) activating, by the secondary processor, the non-active state representation, and (ii) continuing, by the secondary processor, to conduct the communication session using the activated state representation.

The communication session may include a signaling plane and a media plane. Receiving local control of the communication session may involve receiving local control of the media plane while local control of the signaling plane remains with the main processor.

In some embodiments, the computing device includes an audio output apparatus. The secondary processor locally controlling the communication session may involve receiving, by the secondary processor, incoming packets of the communication session from the correspondent device, and forwarding, by the secondary processor, incoming data from the incoming packets directly to the audio output apparatus.

In some embodiments, the computing device includes an audio input apparatus. The secondary processor locally controlling the communication session may involve receiving, by the secondary processor, outgoing data from the audio input apparatus, and forwarding, by the secondary processor, the outgoing data in the form of outgoing packets to the correspondent device.

Additionally embodiments may include one or more of the features disclosed in the context of FIG. 6, or any other figure. Further, although the embodiments herein are described in terms of a "main" processor transferring communication sessions to a "secondary" processor, the communication sessions can be transferred between any types of processor, including between two main processors, between two secondary processors, and so on.

6. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
    conducting, by a computing device, a Real Time Protocol (RTP) communication session, wherein the RTP communication session is locally controlled by a main processor of the computing device, wherein the main processor is in a first power mode and maintains an active state representation of the RTP communication session, wherein packets of the RTP communication session pass through a network interface apparatus of the computing device, wherein a secondary processor in the network interface apparatus reads at least some packets of the RTP communication session to maintain a non-active state representation of at least the RTP communication session and forwards all packets of the RTP communication session received by way of a network to the main processor, and wherein the non-active state representation includes values of RTP header fields for the RTP communication session as read by the secondary processor;
    determining, by the main processor, that local control of the RTP communication session can be transferred to the secondary processor;
    transferring, by the main processor, local control of the RTP communication session to the secondary processor; and
    after local control of the RTP communication session is transferred to the secondary processor, (i) activating, by the secondary processor, the non-active state representation, (ii) conducting, by the secondary processor, the RTP communication session using the values of the RTP header fields, wherein while conducting the RTP communication session the secondary processor forwards no packets of the RTP communication session to the main processor, and (iii) transitioning, by the main processor, from the first power mode to a second power mode, wherein the main processor uses less power when in the second power mode than when in the first power mode.

2. The method of claim 1, wherein the RTP communication session is a media plane of a communication session that also comprises a signaling plane, wherein transferring local control of the RTP communication session to the secondary processor comprises transferring local control of the media plane to the secondary processor while local control of the signaling plane remains with the main processor.

3. The method of claim 1, wherein the computing device comprises an audio output apparatus, wherein the main processor locally controlling the RTP communication session comprises the main processor (i) receiving incoming packets of the RTP communication session from the network interface apparatus, and (ii) forwarding incoming data from the incoming packets to the audio output apparatus, and wherein the secondary processor locally controlling the RTP communication session comprises the secondary processor (i) receiving the incoming packets of the RTP communication session, and (ii) forwarding the incoming data from the incoming packets directly to the audio output apparatus.

4. The method of claim 1, wherein the computing device comprises an audio input apparatus, wherein the main processor locally controlling the RTP communication session comprises the main processor (i) receiving outgoing data from the audio input apparatus, and (ii) forwarding the outgoing data, in the form of outgoing packets, to the network interface apparatus, and wherein the secondary processor locally controlling the RTP communication session comprises the secondary processor (i) receiving the outgoing data directly from the audio input apparatus, and (ii) forwarding the outgoing data in the form of outgoing packets.

5. The method of claim 1, wherein the main processor is a general purpose processor, and the secondary processor is a Wifi interface processor.

6. The method of claim 1, wherein the secondary processor reading at least some packets of the RTP communication session to maintain the non-active state representation comprises:
obtaining session state information from headers of the read packets, including values of RTP header fields; and
writing at least some of the session state information to the non-active state representation.

7. The method of claim 1, wherein the RTP communication session is within a Transmission Control Protocol (TCP) session, and wherein the non-active state representation includes a TCP sequence number, a TCP acknowledgment number, and a TCP advertised window.

8. The method of claim 7, wherein conducting, by the secondary processor, the RTP communication session comprises continuing to conduct the TCP session using the TCP sequence number, the TCP acknowledgment number, and the TCP advertised window.

9. The method of claim 1, further comprising:
determining, by the secondary processor, that the RTP communication session is ending or has ended;
in response to determining that the RTP communication session is ending or has ended, transferring, by the secondary processor, local control of the RTP communication session back to the main processor;
transitioning, by the main processor, from the second power mode to the first power mode; and
terminating, by the main processor, the RTP communication session.

10. The method of claim 9, wherein terminating the RTP communication session comprises exchanging, by the main processor, signaling packets to close the RTP communication session.

11. The method of claim 9, wherein transferring local control of the RTP communication session back to the main processor comprises:
transmitting, by the secondary processor, packets of the RTP communication session from the secondary processor to the main processor.

12. The method of claim 1, further comprising:
determining that the main processor has transitioned from the second power mode to the first power mode; and
in response to determining that the main processor has transitioned from the second power mode to the first power mode, transferring, by the secondary processor, local control of the RTP communication session back to the main processor.

13. The method of claim 1, wherein determining that local control of the RTP communication session can be transferred to the secondary processor comprises:
determining that the main processor is not waiting for arrival of fragmented packets for the RTP communication session.

14. A computing device comprising:
a network interface apparatus configured to exchange packets of a Real Time Protocol (RTP) communication session;
a main processor, configured to operate in either a first power mode or a second power mode, wherein the main processor uses less power when in the second power mode than when in the first power mode, and wherein the main processor is also configured to, while in the first power mode, (i) locally control the RTP communication session, (ii) maintain an active state representation of the RTP communication session, and (iii) transfer local control of the RTP communication session to the secondary processor and enter the second power mode; and
a secondary processor, disposed within the network interface apparatus, wherein the secondary processor is configured to read, while the main processor is in first power mode, at least some packets of the RTP communication session to maintain a non-active state representation of at least the communication session and forward all packets of the RTP communication session received by way of a network to the main processor, wherein the non-active state representation includes values of RTP header fields for the RTP communication session as read by the secondary processor, and wherein the secondary processor is also configured to, after local control of the communication session is transferred to the secondary processor, (i) activate the non-active state representation, and (ii) continue to conduct the communication session using the values of RTP header fields.

15. The computing device of claim 14, wherein the RTP communication session is a media plane of a communication session that also comprises a signaling plane, and wherein transferring local control of the RTP communication session to the secondary processor comprises transferring local control of the media plane to the secondary processor while local control of the signaling plane remains with the main processor.

16. The computing device of claim 14, further comprising:
an audio output apparatus, wherein the main processor locally controlling the RTP communication session comprises the main processor (i) receiving incoming packets of the RTP communication session from the network interface apparatus, and (ii) forwarding incoming data from the incoming packets to the audio output apparatus, and wherein the secondary processor locally controlling the RTP communication session comprises the secondary processor receiving the incoming packets of the RTP communication session, and (ii) forwarding the incoming data from the incoming packets directly to the audio output apparatus.

17. The computing device of claim 14, further comprising:
an audio input apparatus, wherein the main processor locally controlling the RTP communication session comprises the main processor (i) receiving outgoing data from the audio input apparatus, and (ii) forwarding the outgoing data, in the form of outgoing packets, to the network interface apparatus, and wherein the secondary processor locally controlling the RTP communication session comprises the secondary processor (i) receiving the outgoing data directly from the audio input apparatus, and (ii) forwarding the outgoing data in the form of outgoing packets.

18. A method for use by a computing device that includes a main processor and a secondary processor, wherein the secondary processor is disposed within a network interface apparatus of the computing device, the method comprising:
reading, by the secondary processor, at least some packets of a Real Time Protocol (RTP) communication session to maintain a non-active state representation of the RTP communication session, wherein the RTP communication session is locally controlled by the main processor, and wherein the secondary processor forwards all packets of the RTP communication session received by way of a network to the main processor, and wherein the non-active state representation includes values of RTP header fields for the RTP communication session as read by the secondary processor;

determining, by the secondary processor, that local control of the RTP communication session is to be transferred to the secondary processor;

after determining that local control of the RTP communication session is to be transferred to the secondary processor, receiving, by the secondary processor, local control of the RTP communication session; and after local control of the RTP communication session is received by the secondary processor, (i) activating, by the secondary processor, the non-active state representation, and (ii) continuing, by the secondary processor, to conduct the communication session using the values of the RTP header fields, wherein while conducting the RTP communication session the secondary processor forwards no packets of the RTP communication session to the main processor.

19. The method of claim 18, wherein the RTP communication session is a media plane of a communication session that also comprises a signaling plane and a media plane, wherein receiving local control of the RTP communication session comprises receiving local control of the media plane while local control of the signaling plane remains with the main processor.

20. The method of claim 18, wherein the computing device comprises an audio output apparatus, wherein the secondary processor locally controlling the RTP communication session comprises:

receiving, by the secondary processor, incoming packets of the RTP communication session; and forwarding, by the secondary processor, incoming data from the incoming packets directly to the audio output apparatus.

* * * * *